United States Patent [19]

Haslam et al.

[11] 4,192,095
[45] Mar. 11, 1980

[54] SEED TREATING SUSPENSION AND METHOD OF SEED TREATMENT

[76] Inventors: Lester H. Haslam, Box 1121, Twin Falls, Id. 83301; Jay Woods; Verle W. Woods, both of P.O. 1016, Yakima, Wash. 98901

[21] Appl. No.: 929,819

[22] Filed: Jul. 31, 1978

[51] Int. Cl.$^2$ ............................................... A01C 1/06
[52] U.S. Cl. ........................................... 47/58; 427/4; 47/57.6; 47/DIG. 9; 111/1; 106/266
[58] Field of Search .................... 47/58, 57.6, DIG. 9; 71/65; 424/168; 111/1

[56] References Cited

U.S. PATENT DOCUMENTS

| | | | |
|---|---|---|---|
| 2,828,010 | 3/1958 | Gompper | 47/DIG. 9 |
| 2,957,803 | 10/1960 | Woods | 424/168 |
| 2,967,376 | 1/1961 | Scott | 47/57.6 |
| 3,460,492 | 8/1969 | Dickinson et al. | 47/57.6 X |
| 3,849,105 | 11/1974 | Woods | 71/65 |
| 4,068,602 | 1/1978 | Mickus et al. | 111/1 |

*Primary Examiner*—Robert E. Bagwill
*Attorney, Agent, or Firm*—Wells, St. John & Roberts

[57] ABSTRACT

Heavy coated seeds for crops such as rice are produced by application of an oleaginous suspension of a solid, inert water-insoluble inorganic particulate material in a discontinuous oil phase dispersed in a continuous water phase. The suspension is mixed with the seeds and the coated seeds are permitted to cure during absorption of the suspension components. The suspension remaining on the seed surfaces inverts and adheres to the surfaces to increase the weight of the seeds. The suspension comprises a continuous water phase, a discontinuous oil phase, and a finely ground inert inorganic particulate material.

10 Claims, No Drawings

SEED TREATING SUSPENSION AND METHOD OF SEED TREATMENT

BACKGROUND OF THE INVENTION

This invention relates to the treating and coating of seeds for agricultural purposes. It was designed specifically for coating of rice prior to planting of fields by conventional aircraft application. Rice is typically planted in ponds, where the planting soil is covered by shallow amounts of water. Because of the normal weight and size of the rice seed, rice tends to float in water. This tendency to float results in inaccurate planting and substantial variations in the resulting patterns of plant growth.

To counteract this difficulty, it is desirable to develop a method for inexpensively adding weight to the individual treated seeds. The present suspension and method for treating the seeds has been developed as an answer to these problems.

DESCRIPTION OF THE PREFERRED EMBODIMENT

This invention relates to a method for treating crop seeds and to a suspension for coating seeds. The purpose is to produce heavy seeds which will sink when planted in water. The method and product are particularly designed for coating of rice. The suspension is designed as a stable suspension produced as a concentrate and later diluted by mixing with water immediately prior to its application on the seeds.

The weight applied to the seeds is obtained by production of a suspension containing an inert water-insoluble inorganic particulate material having a substantial density in comparison to water or seeds. The suspension further contains a continuous water phase and a discontinuous oil phase. The inorganic particulate material is suspended in the oil phase and dispersed within the water phase.

The suspension is produced by the method generally taught in U.S. Pat. No. 2,957,803, which was granted Oct. 25, 1960 to Verle W. Woods and is entitled "Method of Preparing Suspensions of Insecticides". The disclosure of this patent is hereby incorporated within this disclosure by reference.

The suspension includes the following elements:
(a) water
(b) urea, sugar or other weighting agents soluble in water to increase the specific gravity of the water phase. Water soluble fertilizers such as potassium nitrate, amonium phosphates can be used in place of the urea. The urea acts as a surfactant which serves the function of conditioning the surfaces of the inorganic particles in the suspension.
(c) emulsifiers, such as Sponto N-300B or N-500B, produced and sold by Witco Chemical Corporation, Chicago, Illinois. These are conventional emulsifiers which also condition the particle surfaces for reception of the suspension materials. The major components of the emulsifier sold under the designations "Sponto N-300B and N-500B are:

Aklyl ($C_8$–$C_{24}$) benzenesulfonic acid . . . calcium . . . salt Alpha-(p-Nonylphenyl)-Omega-Hydroxypoly (oxyethylene) produced by the condensation of 1 mole of nonylphenol . . . with an average of 4–14 or 20–90 moles of ethylene oxide.

(d) an oil component. The term "oil" includes an oleaginous material commonly designated as an oil or fat, whether of animal, vegetable or mineral origin. A suitable example is an agricultural spray oil sold by Witco Chemical Corporation under the trade designation 9093LM. The oil used in this process must be hydrophobic.

(e) an inert, solid, water insoluble inorganic particulate material. Suitable examples of such material are: pyrite, other sulfites; silica sands; flue dusts from zinc smelting, iron blast, furnaces or foundries; zinc ores. To prepare the initial concentrated suspension, selected quantities of the above elements are mixed and recirculated through a mixing system as described in U.S. Pat. No. 2,957,803. In a batch process, the first step is to add water to the mixing apparatus and activate the apparatus to bring recirculation of the water. Urea and emulsifier is then added to the recirculating water, followed by the oil and the finely ground inorganic particulate material. It is advisable to recirculate and mix the elements of the suspension over a substantial period such as one half hour to assure thorough mixing of all of the particles. The time involved is not of substantial importance so long as it is adequate to assure thorough mixing.

The shelf life of the concentrated suspension depends somewhat on the size of the inorganic particles. We have found it to be advisable to use particles which have been screened so as to pass through a 325 mesh screen or one that is even finer. Using larger particles substantially shortens the life of the concentrated suspension.

The water insoluble inorganic particulate material should preferably have a density of 2.7 grams per cubic centimeter or higher. This will provide adequate weight to the coated seeds to assure that the seeds will sink when distributed in a flooded field.

The resulting concentrated suspension can be bottled and stored until used to form an application mixture just prior to the application on the seeds. This mixture will remain stable on the shelf for months with no appreciable settling or separation at normal room temperatures.

To use the suspension, it is added to a conventional mixer in a seed treating machine. The suspension is typically mixed with two parts water to one part of the concentrated suspension and maintained in continuous agitation. It is applied to the seeds for coating purposes in the normal coating processes well known in the seed treating industry and by use of conventional machinery. Conventional pesticide formulations for seed treating can be mixed with the suspension to produce a coating that will provide insect control or fungicidal properties as well as the additional weight desired on each seed.

The inorganic particulate material should comprise approximately 75% to 90% of the total weight of the oil phase components. In turn, the combined weight of the particulate material and the oil phase components should constitute approximately 20% to 30% by weight of the total suspension mixture as applied to the seeds. This requires that the weight of the inorganic particulate material and oil phase components constitute between 60% to 90% by weight of the concentrated suspension components.

EXAMPLE 1

133.4 grams of water was first placed in a mixing and recirculating tank and a mechanical agitator was started to recirculate and mix the contents of the apparatus. To this was added 65.8 grams of urea, followed by 29.9 grams of emulsifier (Sponto N-500B). As the liquid continued to be agitated vigorously, 158.3 grams of oil (Witco 9093LM) was added, followed by 993.6 grams of pyrite (325 mesh). Agitation was continued for about one half hour until the resulting liquid was smooth, indicating that the urea had been dissolved in the water and that the oil and particulate components had been dispersed uniformly in the continuous water phase.

The resulting suspension had a viscosity of 2600 cps and a density of 2.34 grams per cubic centimeter. It was bottled and stored until needed for seed treatment purposes.

The concentrated suspension readily dispersed in water when added to a conventional mixer in a seed treatment installation. The suspension was applied to rice seeds in the usual fashion so as to uniformly coat the seed surfaces. The coated seeds were then allowed to cure during absorption of the suspension components. At least a portion of the water phase was readily absorbed into the seeds, which caused the suspension materials remaining on the seed surfaces to invert so that the oil phase becomes the continuous suspension phase on the resulting coating. This relatively dry, oily coating of fine particulate material imparts the needed weight to the seeds to assure that they will not float when dispersed in a flooded field. This is typically accomplished by aircraft application of the seeds. The coating is durable and readily withstands normal seed handling and planting processes.

In this example, the particulate pyrite comprises about 86% by weight of the discontinuous oil phase containing the oily components and the pyrite. The pyrite and oil phase components comprise approximately 83% of the entire concentrated suspension. When diluted by two parts of water, the percentage of pyrite and oil phase components in the mixture applied to the seeds is approximately 28% by weight.

EXAMPLE 2

The same process steps were carried out with the following components to produce a suspension concentrate having a density of 2.05 grams per centimeter: water—66.1 grams; urea—32.6 grams; emulsifier (Sponto N-500B)—14.8 grams; oil (Witco 9093-LM)—78.5 grams; barite—408.0 grams.

When using the above ingredients, the percentage of barite in the barite and oil phase is 83% by weight. The percentage of barite and oil phase in the total concentrated suspension is 81% by weight. When mixed with two parts water, the percentage of barite and oil phase components in the seed treating mixture is 27% by weight.

EXAMPLE 3

The same process steps described with respect to Example 1 were utilized with the following ingredients to produce a suspension concentrate having a density of 2.39 grams per cubic centimeter:

Water—56.8 grams; urea—28.0 grams; emulsifier (Sponto N-500B)—12.7 grams; oil (Witco 9093-LM)—67.4 grams; magnetite—435.0 grams.

The above ingredients produce a concentrated suspension containing 86% by weight of magnetite in the oleaginous phase. The magnetite and oil phase components comprise 85% by weight of the total concentrated suspension and 28% by weight of the diluted mixture applied to the seed surfaces.

There is substantial room for variation of the proportions of the ingredients in the above suspension, depending upon the density of the suspension which is to be applied to the seeds to assure proper weighting of them. The amount of water in the concentrate should be only that amount necessary to provide a continuous water phase within which the oil phase and particulate materials can be evenly dispersed. The urea or weighting compounds can be eliminated entirely, although they do assist in surface treatment to facilitate the stabilizing of the inorganic particles in the suspension. The amount of emulsifier is usually dictated by the manufacturer's suggested uses and is well within the skill of those trained in this field.

Having described our invention, we claim:

1. A method for treating crop seeds to produce coated seeds having increased weight, comprising the following steps:

forming an oleaginous suspension of an inert, solid water insoluble inorganic particulate material having a density of at least 2.7 grams per cubic centimeter in a discontinuous oil phase dispersed in a continuous water phase, the weight of the inorganic particulate material constituting 75% to 90% of the total weight of the oil phase, including the inorganic particulate material and the weight of the oil phase including the inorganic particulate material constituting 20% to 30% of the total suspension by weight.

mixing the suspension and seeds so as to apply the suspension onto the surfaces of the seeds;

and permitting the coated seeds to cure during absorption of the suspension components, whereby the suspension remaining on the seed surfaces inverts.

2. A method as set out in claim 1 wherein the suspension is prepared by mixing an oleaginous component with an emulsifier and water together with a preselected amount of the water insoluble inorganic particulate material.

3. A method as set out in claim 2 wherein the inorganic particulate material is barite.

4. A method as set out in claim 2 wherein the inorganic particulate material is magnetite.

5. A method as set out in claim 2 wherein the inorganic particulate material is pyrite.

6. A method as set out in claim 2 wherein the inorganic particulate material has a particle size no larger than is capable of passing through a 325 mesh screen.

7. A method for treating rice seeds comprising the following steps:

forming an oleaginous suspension of an inert, solid, water insoluble inorganic particulate material in a discontinuous oil phase dispersed in a continuous water phase, the inorganic particulate material having a density of at least 2.7 grams per cubic centimeter and a particle size no larger than is capable of passing through a 325 mesh screen;

the weight of the inorganic particulate material constituting 75% to 90% of the weight of the oil phase, including the inorganic particulate material and the weight of the oil phase and inorganic particulate material constituting 20% to 30% of the total suspension by weight;

mixing the suspension and seeds so as to apply the suspension onto the surfaces of the seeds;

and permitting the coated seeds to cure during the absorption of the suspension components, whereby the suspension remaining on the seed surfaces inverts.

8. A method as set out in claim 7 wherein the inorganic particulate material is barite.

9. A method as set out in claim 7 wherein the inorganic particulate material is magnetite.

10. A method as set out in claim 7 wherein the inorganic particulate material is pyrite.

* * * * *